(12) United States Patent
Rajasekaran (10) Patent No.: US 10,973,367 B2
(45) Date of Patent: *Apr. 13, 2021

(54) COOKWARE SET WITH LID SUPPORT

(71) Applicant: E. MISHAN & SONS, INC., New York, NY (US)

(72) Inventor: Mohan Rajasekaran, Watertown, CT (US)

(73) Assignee: E. Mishan & Sons, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/071,670

(22) Filed: Oct. 15, 2020

(65) Prior Publication Data

US 2021/0030198 A1 Feb. 4, 2021

Related U.S. Application Data

(63) Continuation of application No. 16/873,668, filed on Jul. 31, 2020, and a continuation-in-part of application No. 29/747,016, filed on Aug. 19, 2020.

(51) Int. Cl.
*A47J 36/12* (2006.01)
(52) U.S. Cl.
CPC ..................................... *A47J 36/12* (2013.01)
(58) Field of Classification Search
CPC .. A47J 36/12; A47J 36/06; A47J 36/10; A47J 36/16; A47J 36/00; A47J 45/10; A47J 43/287; B65D 55/16; B65D 55/00
See application file for complete search history.

(56) References Cited

U.S. PATENT DOCUMENTS

| 314,244 | A | | 3/1885 | Henkel | |
|---|---|---|---|---|---|
| 498,020 | A | | 3/1893 | Murray | |
| 1,928,995 | A | | 8/1933 | Di Biase | |
| 2,705,657 | A | | 4/1955 | Di Giorgio | |
| 2,808,175 | A | * | 10/1957 | Aiken | A47J 36/10 220/379 |
| 3,081,394 | A | | 3/1963 | Arel | |
| 4,005,798 | A | | 2/1977 | Minsky | |
| 4,592,483 | A | | 6/1986 | Scouten | |
| D619,892 | S | | 6/2010 | Welk | |
| 8,167,163 | B2 | | 3/2012 | Chen | |
| 9,125,514 | B1 | * | 9/2015 | Rohrer | A47J 36/12 |
| 2006/0174776 | A1 | | 8/2006 | Fissler | |
| 2011/0095031 | A1 | | 4/2011 | Welk | |
| 2016/0015208 | A1 | | 1/2016 | Pallotto | |

FOREIGN PATENT DOCUMENTS

| KR | 200350556 Y1 | 5/2004 |
|---|---|---|
| KR | 20100111209 A | 10/2010 |

* cited by examiner

*Primary Examiner* — Don M Anderson
(74) *Attorney, Agent, or Firm* — Notaro, Michalos & Zaccaria P.C.

(57) ABSTRACT

A cookware set includes a pot, a lid configured to fit on and cover the pot in a first position, and a support attached to an upper surface of the lid and disposed at the edge of the lid and configured to support the lid in a substantially vertical position on a rim of the pot in a second position. The support has a base and two wings extending from the base, each of the two wings disposed on an opposite end of the base and having a bent portion bent inward toward the base to define a two-piece channel defined by an upper surface of the base and inner surfaces of the wings. The channel is configured to receive a rim of the pot in the second position.

10 Claims, 11 Drawing Sheets

COOKWARE SET WITH LID SUPPORT

CROSS-REFERENCE TO RELATED APPLICATIONS

This application is a continuation of U.S. patent application Ser. No. 29/744,869, filed Jul. 31, 2020, which is incorporated herein in its entirety for all purposes.

Additionally, this application is a continuation-in-part of U.S. patent application Ser. No. 29/747,016, filed Aug. 19, 2020, which is incorporated herein in its entirety for all purposes.

FIELD AND BACKGROUND OF THE SUBJECT TECHNOLOGY

The subject technology relates to household or commercial cookware vessels and lids, for example, pots and pans with removable lids, which may be used to cook food on a range top or in an oven.

A person using a cookware vessel with a removable lid on a range top will often need to remove the lid during the cooking process, for example, to stir the contents being cooked, or to add ingredients during cooking. This may require setting the lid aside on a nearby surface such as a countertop. However, this entails the problem of soiling the surface with material that may be on the lid.

There is a need to provide some means to temporarily stow a removable lid during cooking, within easy reach of the user, without soiling nearby surfaces.

U.S. Pat. No. 2,808,175 is directed to a pot lid handle and holder. The disclosed lid handle/holder supports the lid in a substantially vertical position, but pot and lid in the disclosed position is not stable and will tend to tip over in use.

SUMMARY OF THE SUBJECT TECHNOLOGY

According to an aspect of the subject technology, a cookware set comprising a pot and a lid is provided. The lid has a support attached at the edge of the lid for safely and temporarily supporting the lid on the rim of the pan. The support is configured and disposed so that the lid is supportable in a substantially vertical position on the edge of the pot, with the bottom of the lid facing inwards, and a lower portion of the lid below the rim of the pot, so that any material dripping or falling off of the lid will end up in the pot. The support has a base attached to the lid, and two wings disposed on opposite ends of the base, the wings folded inward to form and define a two-part channel for receiving the rim of the lid. The wings are separated by a distance, forming a stable base for supporting the lid on the rim of the pot.

According to an aspect of the subject technology, a cookware set comprises a pot, a lid configured to fit on and cover the pot in a first position, and a support attached to an upper surface of the lid and disposed at the edge of the lid and configured to support the lid in a substantially vertical position on a rim of the pot in a second position, the support comprising a base and two wings extending from the base, each of the two wings disposed on an opposite end of the base and having a bent portion bent inward toward the base to define a two-piece channel defined by an upper surface of the base and inner surfaces of the wings, the channel configured to receive a rim of the pot in the second position.

DETAILED DESCRIPTION OF THE SUBJECT TECHNOLOGY

According to non-limiting aspects of the subject technology, FIGS. 1-8 show an embodiment of a cookware set comprising a lid 1 having a handle 2, lid 1 having a lid support 10. Additionally, FIGS. 9-12 show an embodiment of a lid (depicted in broken lines) having a lid support 50.

Figure 1:
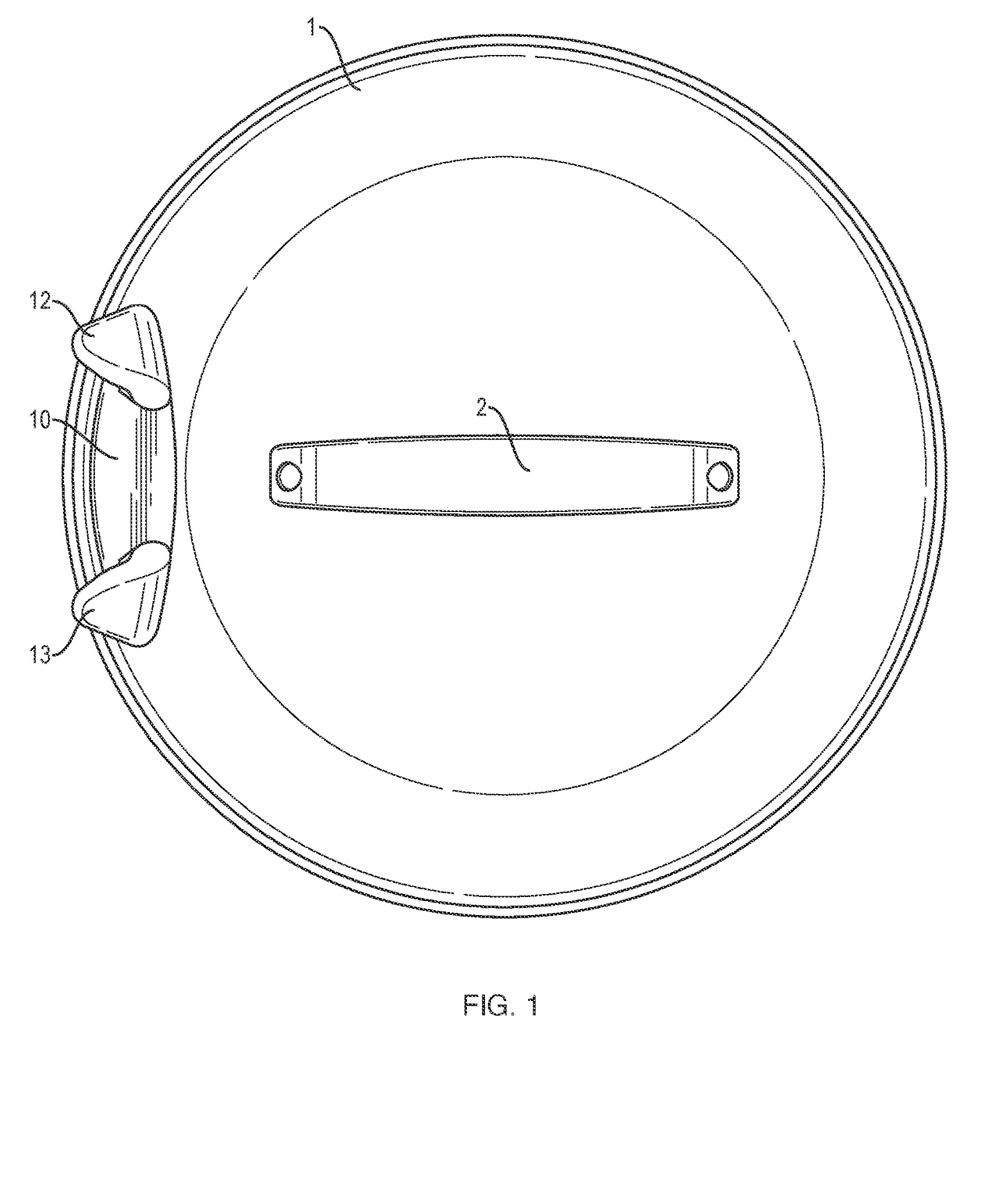
FIG. 1 is a plan view of an exemplary embodiment of a pot lid with a lid support.
Figure 2:
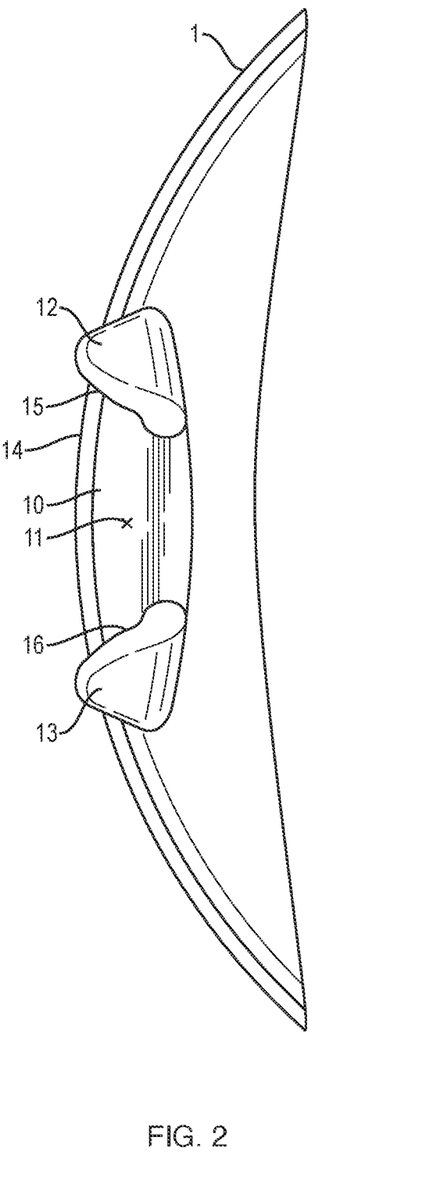
FIG. 2 is a detail view of FIG. 1 showing the lid support.

Lid 1 fits to cover pot 3. Lid 1 has a lid support 10 attached to an upper surface of lid 1 for supporting lid 1 in a substantially vertical position on the rim of pot 3, to provide access to the contents of pot 3 without the necessity of placing lid 1 on a nearby surface. Lid support 10 is attached to lid 1 by, for example, a permanently-bonding adhesive, for example epoxy, or rivets passing through holes in lid 1, or any other means of permanently attaching lid support 10 to lid 1.

Lid support 10 is formed and configured to support lid 1 in a substantially vertical position on the rim 4 of pot 3. In the embodiment illustrated, lid support 10 comprises a base 11 which is bonded to the upper surface of lid 1. Base 1 has a curved profile 14 on an edge thereof which is shaped to match the curvature of lid 1. In an embodiment, the curved profile 14 of base 11 of support 10 follows and does not extend beyond the edge of lid 1. In an embodiment, base 11 has a beveled edge 19 along the curved profile 14 (best seen in FIG. 8). On opposite ends of base 11, wings 12, 13 extend upward from base 11. Wing 13, for example, has upwardly-extending portion 17. The distal ends of wings 12, 13 are curved or hooked inward with respect to the upwardly-extending portions and toward base 11 to form a two-part channel 15, 16 between base 11 and the inner surfaces of wings 12, 13. In the embodiment shown, the distal ends are bent inward toward the base to form an acute angle of less than 90 degrees with the upwardly-extending portions of the respective wings. In an embodiment, the acute angle is 80 degrees, or approximately 80 degrees, or within the range of 75-85 degrees. In other embodiments, the distal ends are bent inward to form a right angle or an obtuse angle. The channel 15, 16 is configured and adapted to receive a rim 4 of pot 3.

Figure 3:
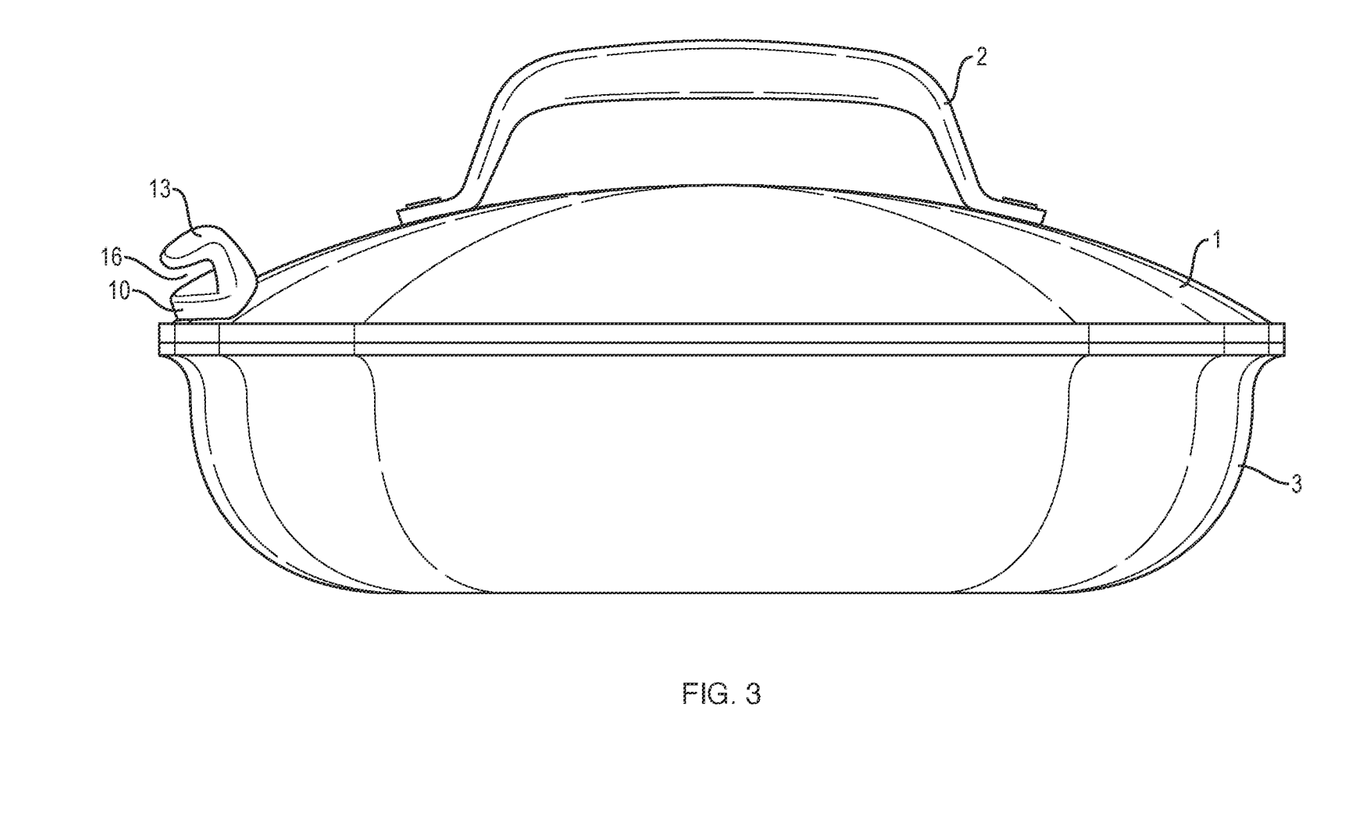
FIG. 3 is an elevation view of a cookware set comprising a pot with a removable fitted lid having a lid support according to an embodiment, in a first position with the rim of the lid fitted on the rim of the pot.
Figure 4:
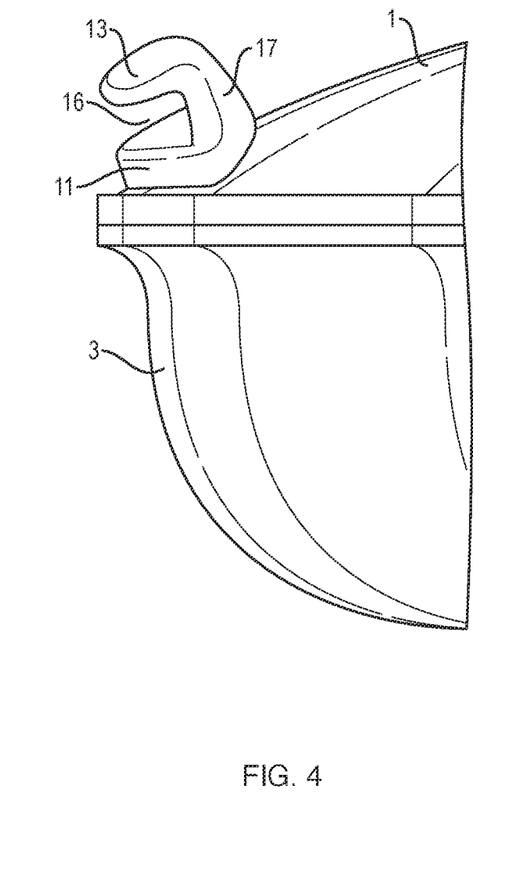
FIG. 4 is a detail view of FIG. 3 showing the lid support.

In a first position, best seen in FIGS. 3 and 4, lid 1 is placed on the rim 4 of pot 3 to cover the pot. The curved profile 14 of support 10 does not extend beyond the rim 4 of pot 3.

Figure 5:
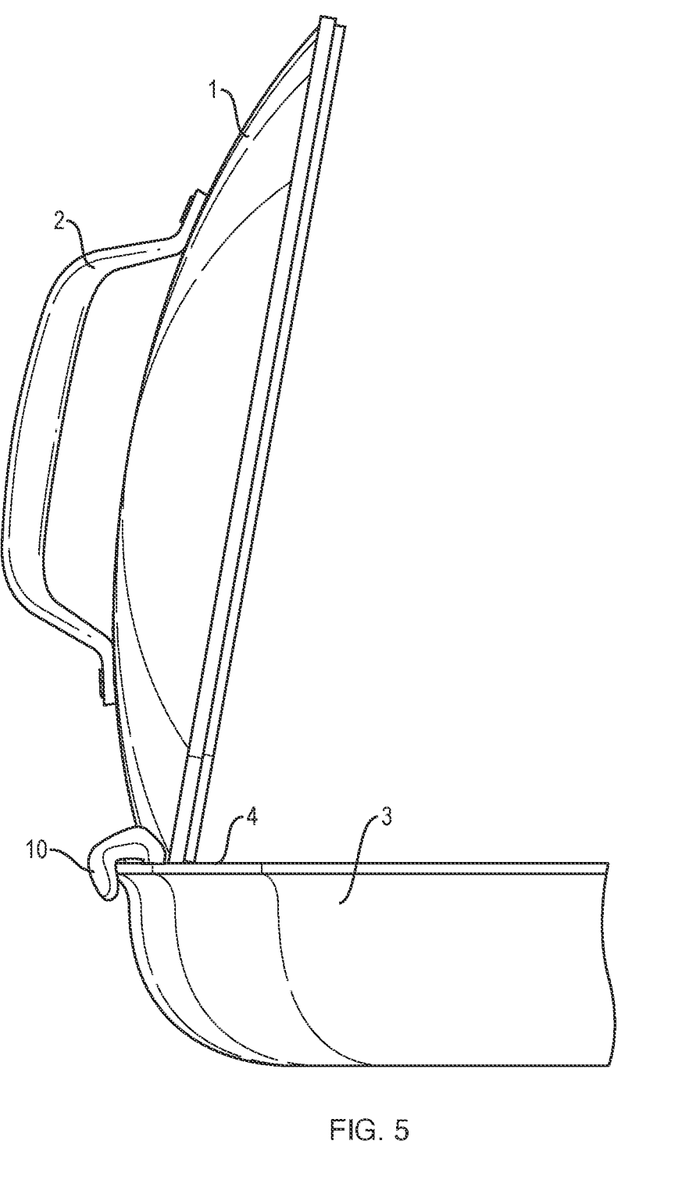
FIG. 5 is an elevation view of a cookware set comprising a pot with a removable fitted lid having a lid support according to an embodiment, in a second position with the lid supported by the support on the rim of the pot.
Figure 6:
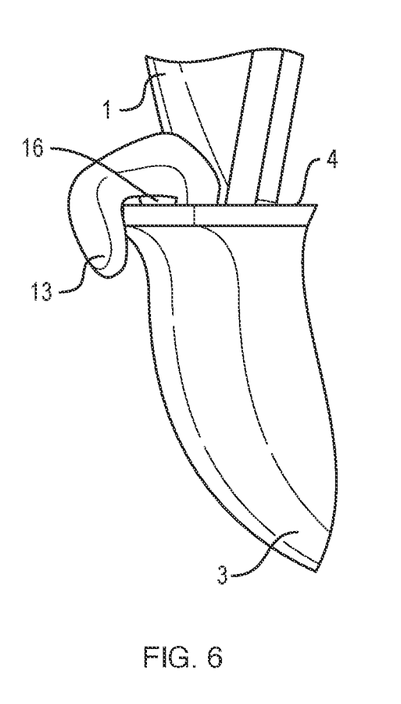
FIG. 6 is a detail view of FIG. 5 showing the lid support.

In a second position, best seen in FIGS. 5 and 6, lid 1 is supported by support 10 in a substantially vertical position on the rim 4 of pot 3. The rim 4 of pot 3 is received in channel 15, 16 of support 10 and lid 1 is supported and stabilized in a substantially vertical position by the contact of the inner surface of channel 15, 16 with rim 4 of pot 3. Lid 1, in the second position, is supported entirely over pot 3 and is slightly inclined inward from vertical, at an angle of 10 degrees, or approximately 10 degrees, or up to 10 degrees, or up to 15 degrees, or within the range of 5 to 10 degrees, or within the range of 5 to 15 degrees, from vertical, so that any material dripping or falling from lid 1 will land in pot 3 rather than an adjacent surface. Additionally, the inward inclination of the lid 1 over the pot 4 in the second position locates the center of gravity of the cookware set over the floor of pot 4, so that the cookware set is in a stable configuration (i.e. not likely to tip over due to the lid 1 being in a vertical position). In the second position, an edge of lid 1 is suspended below the rim of pot 3.

Figure 7:
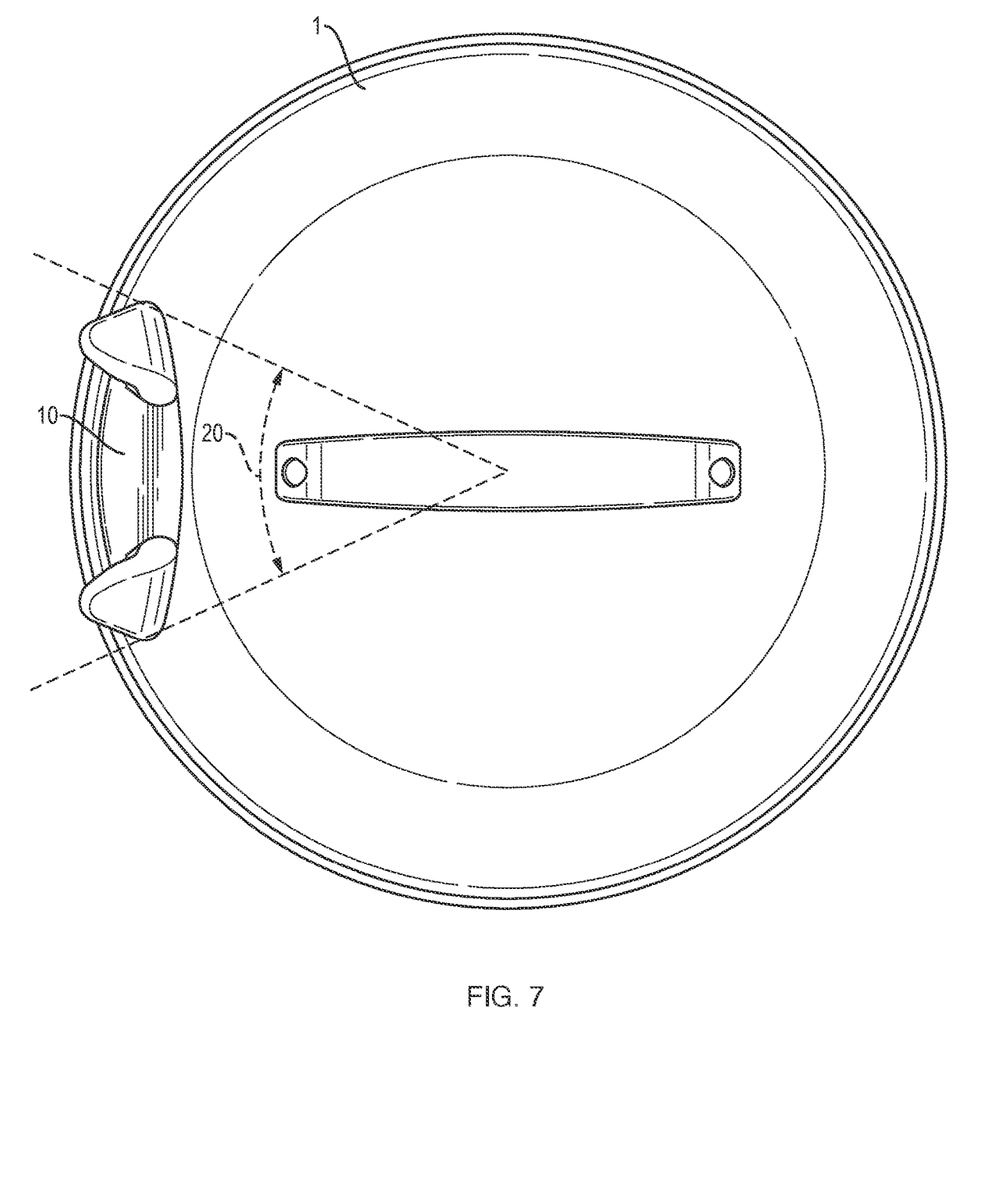
FIG. 7 is a plan view of an exemplary embodiment of a pot lid with a lid support.
Figure 8:
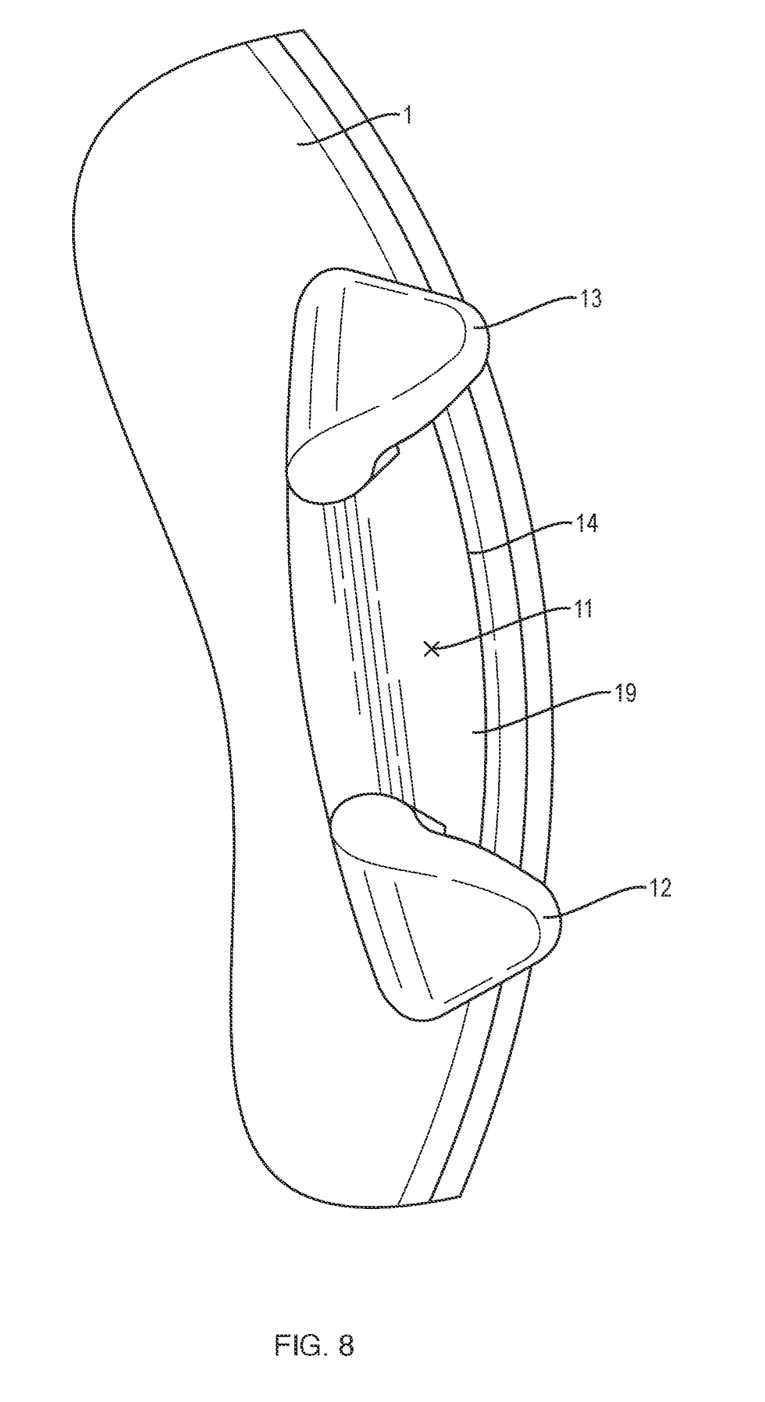
FIG. 8 is a detail view of a pot lid with a lid support according to an embodiment.
Figure 9:
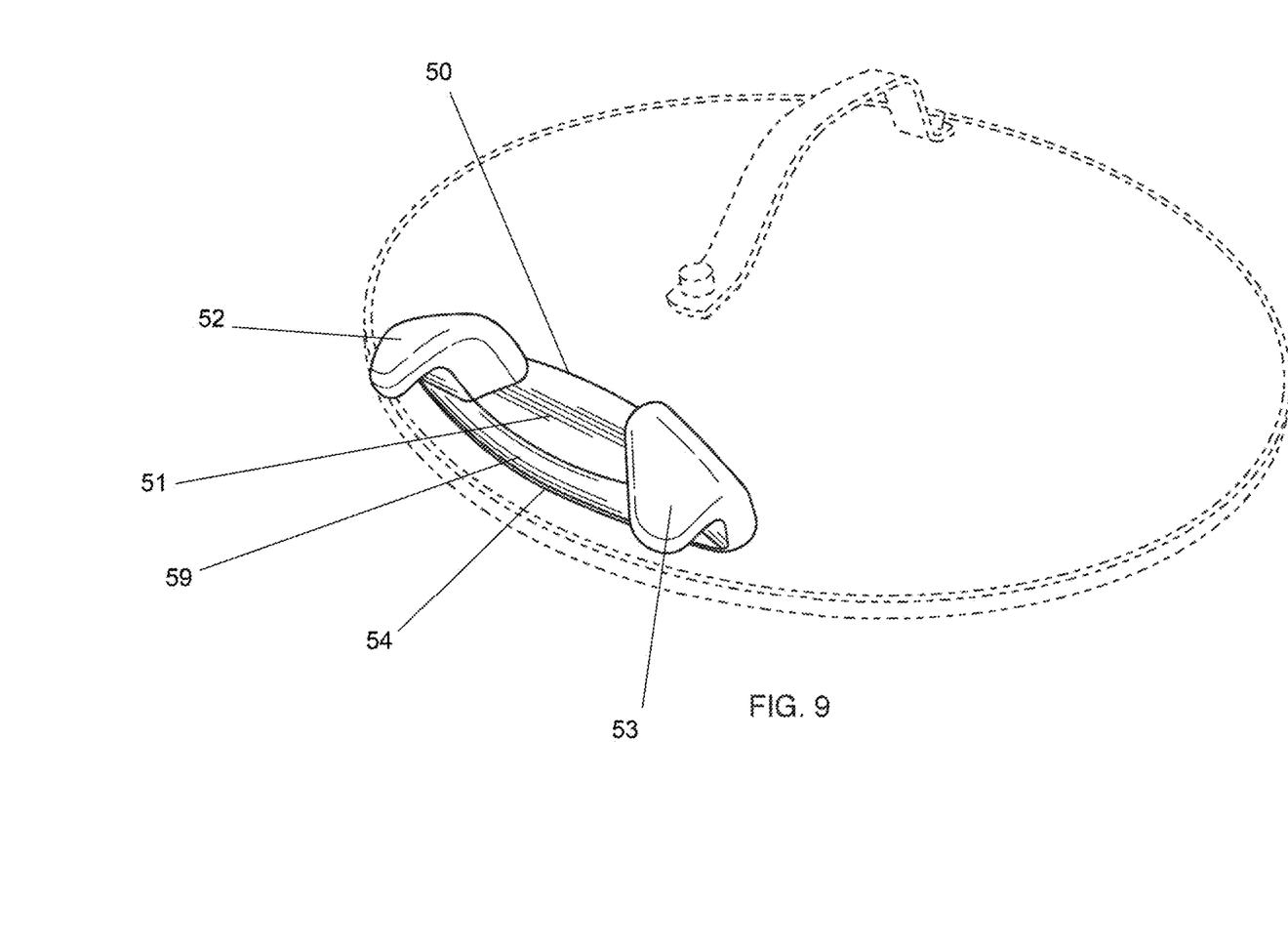
FIG. 9 is a top perspective view of a pot lid (in broken lines) with a lid support according to an embodiment.
Figure 10:
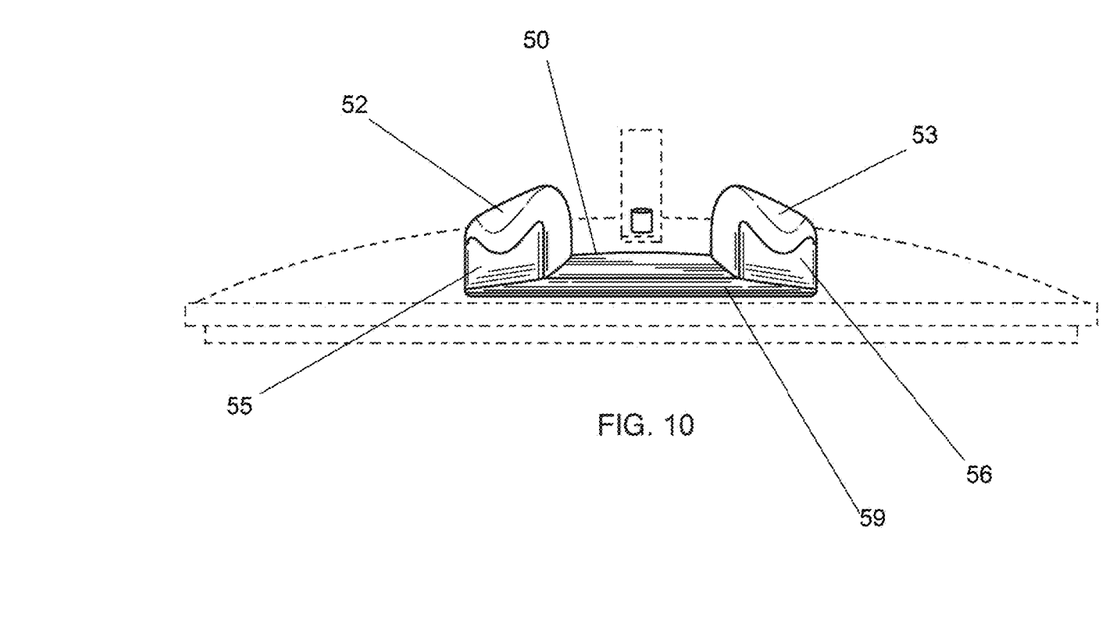
FIG. 10 is a front elevation view of a pot lid (in broken lines) with a lid support according to an embodiment.
Figure 11:
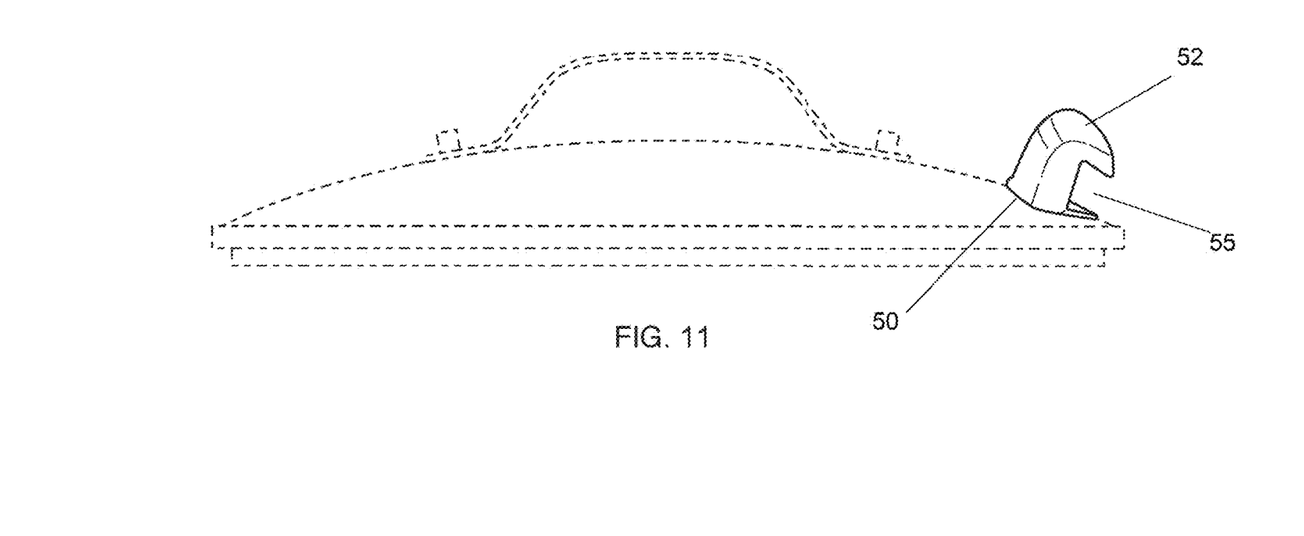
FIG. 11 is a side elevation view of a pot lid (in broken lines) with a lid support according to an embodiment.
Figure 12:
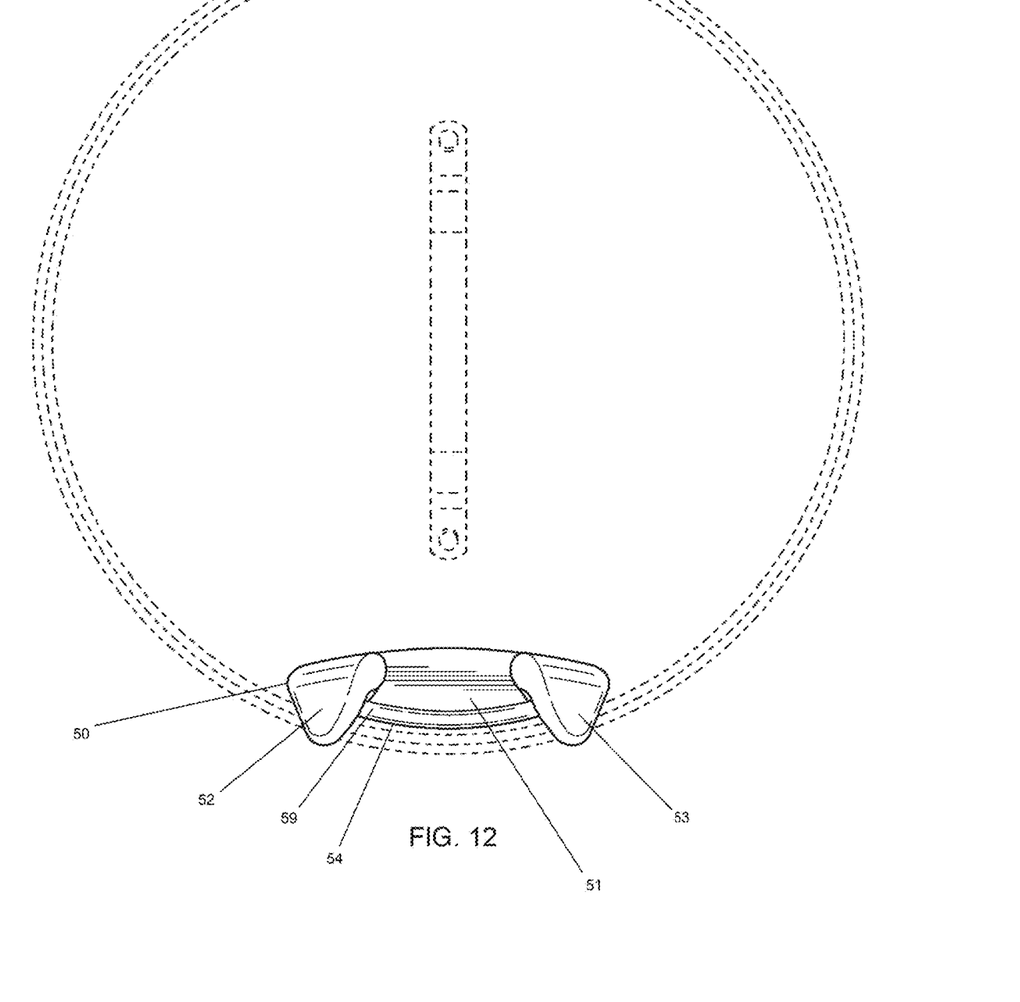
FIG. 12 is a plan view of a pot lid (in broken lines) with a lid support according to an embodiment.

Preferably, the channel defined by support 10 is relatively long, to enable lid 1 to be supported in a stable position. In an embodiment, as best seen in FIG. 7, the channel of support 10 subtends an angle 20 with respect to the center of lid 1. In embodiments, angle 20 is 40 degrees, or approximately 40 degrees, or within the range of 38 to 42 degrees, or within the range of 35 to 45 degrees.

In an embodiment, the support 10 is a single, unitary piece of a material suitable for use in cookware, for example, metal, or heat-resistant plastic and may be manufactured by, for example, by injection molding or 3D printing.

Turning now to FIGS. 9-12, lid support 50 is similar in structure and function to lid support 10 and is configured to support its attached lid on the rim of a cookware vessel, as in the case of lid support 10. Lid support 50 comprises a base 51 with a curved profile 54 on an edge thereof which is shaped to match the curvature of the attached lid. Base 51 has a beveled edge 59 along the curved profile 54. On opposite ends of base 51, wings 52, 53 extend upward on upwardly-extending portions. The distal ends of wings 52, 53 are curved or hooked inward with respect to the upwardly-extending portions and toward base 51 to form a two-part channel 55, 56 between base 51 and the inner surfaces of wings 52, 53. In the embodiment shown, the distal ends are bent inward toward the base to form an acute angle of less than 90 degrees with the upwardly-extending portions of the respective wings. In an embodiment, the acute angle is 80 degrees, or approximately 80 degrees, or within the range of 75-85 degrees. In other embodiments, the distal ends are bent inward to form a right angle or an obtuse angle. The channel 55, 56 is configured and adapted to receive the rim of a pot and thereby support the attached lid on the rim. Support 50 is configured to support the lid on the rim of aa pot in a stable, vertical position, preferably slightly inclined inward, as previously described with respect to support 10.

While specific embodiments of the subject technology have been shown and described in detail to illustrate the application of the principles of the subject technology, it will be understood that the invention may be embodied otherwise without departing from such principles. It will also be understood that the present subject technology includes any combination of the features and elements disclosed herein and any combination of equivalent features. The exemplary embodiments shown herein are presented for the purposes of illustration only and are not meant to limit the scope of the subject technology.

What is claimed is:

1. A cookware set comprising a pot, a lid configured to fit on and cover the pot in a first position, and a support attached to an upper surface of the lid and disposed at the edge of the lid and configured to support the lid in a vertical position on a rim of the pot in a second position, the support comprising a base and two wings extending from the base, each of the two wings disposed on an opposite end of the base and having a bent portion bent inward toward the base to define a two-piece channel defined by an upper surface of the base and inner surfaces of the wings, the channel configured to receive a rim of the pot in the second position.

2. The cookware set of claim 1 wherein the channel has a length subtending an angle with respect to the center of the lid, the angle being 45 degrees or within the range of 38 to 42 degrees, or within the range of 35 to 45 degrees.

3. The cookware set of claim 1 wherein the support is a single piece of metal or molded heat-resistant plastic.

4. The cookware set of claim 1 wherein, in the second position, the lid is supported on the rim of the pot so that it is inclined inward from vertical, at an angle of 10 degrees, or up to 10 degrees, or up to 15 degrees, or within the range of 5 to 10 degrees, or within the range of 5 to 15 degrees.

5. The cookware set of claim 1 wherein the base of the support has an outer edge with a curved profile, the outer edge of the support not extending beyond the edge of the lid.

6. The cookware set of claim 1 wherein in the second position, the edge of the lid adjacent to the support is supported below the rim of the pot.

7. The cookware set of claim 1 wherein each bent portion is bent inward to form an angle of 80 degrees or within the range of 75-85 degrees.

8. The cookware set of claim 1 wherein the base of the support has a beveled edge along the curved profile.

9. A lid support configured to be attached to an upper surface of a lid for the cookware vessel, the lid having an edge and the vessel having a rim, the lid configured to cover the cookware vessel in a first position in which the lid rests on the rim of the vessel in a horizontal position, the lid support comprising:
   a base adapted to be attached to the upper surface of the lid;
   at least one wing extending from the base;
   each of the at least one wing having a bent portion bent inward toward the base, the bent portion having an inner surface opposing an upper surface of the base, to define a channel between the base and inner surfaces;
   the channel configured to receive a rim of the cookware vessel such that the lid is supported by the lid support on the rim in a second position;
   wherein the second position is vertical; and
   wherein the at least one wing comprises two wings disposed apart from each other on the base.

10. The lid support of claim 9 wherein the two wings are disposed on opposite ends of the base.

* * * * *